(12) United States Patent
Amadieu et al.

(10) Patent No.: US 12,437,324 B2
(45) Date of Patent: Oct. 7, 2025

(54) DEVICE, SYSTEM AND METHOD FOR REPRODUCING A REQUESTING STEP BETWEEN A CLIENT DEVICE AND A PROVIDER SYSTEM AT AN INTERMEDIATION SERVER

(71) Applicant: AMADEUS S.A.S., Biot (FR)

(72) Inventors: Olivier Amadieu, Roquefort les Pins (FR); Yannick Devaux, Mougins (FR); Jean-Marie Cazorla, Opio (FR); Yara Kazma, Le Rouret (FR)

(73) Assignee: AMADEUS S.A.S., Biot (FR)

( * ) Notice: Subject to any disclaimer, the term of this patent is extended or adjusted under 35 U.S.C. 154(b) by 329 days.

(21) Appl. No.: 18/072,782

(22) Filed: Dec. 1, 2022

(65) Prior Publication Data

US 2024/0185309 A1   Jun. 6, 2024

(51) Int. Cl.
*G06Q 10/02* (2012.01)
*G06Q 30/0283* (2023.01)

(52) U.S. Cl.
CPC ......... *G06Q 30/0283* (2013.01); *G06Q 10/02* (2013.01)

(58) Field of Classification Search
CPC .......................... G06Q 30/0283; G06Q 10/02
USPC ........................................... 705/5, 7.35, 400
See application file for complete search history.

(56) References Cited

U.S. PATENT DOCUMENTS

| | | | |
|---|---|---|---|
| 2008/0198761 A1* | 8/2008 | Murawski | H04L 67/51 370/254 |
| 2017/0270576 A1* | 9/2017 | Rollins | H04L 67/56 |
| 2020/0379971 A1* | 12/2020 | Hays | G06F 16/252 |
| 2021/0117849 A1 | 4/2021 | Amadieu et al. | |
| 2021/0117850 A1 | 4/2021 | Amadieu et al. | |
| 2021/0118030 A1* | 4/2021 | Amadieu | G06Q 30/0619 |
| 2021/0174266 A1 | 6/2021 | Akrimi et al. | |

FOREIGN PATENT DOCUMENTS

| | | | | |
|---|---|---|---|---|
| EP | 1489529 A1 * | 12/2004 | | G06Q 30/02 |
| EP | 3825946 A1 | 5/2021 | | |
| EP | 4202809 A1 * | 6/2023 | | G06Q 10/06 |
| FR | 3069076 A1 * | 1/2019 | | H04L 67/02 |

* cited by examiner

*Primary Examiner* — Shannon S Campbell
*Assistant Examiner* — Freda A Nelson
(74) *Attorney, Agent, or Firm* — Perry + Currier INC.

(57) ABSTRACT

A device, system and method for reproducing a requesting step between a client device and a provider system at an intermediation server. An intermediation server reproduces a requesting step for one or more provider objects, including requesting identifiers and price estimates thereof, a provider object representing at least one item provided by a provider system, the reproducing of the requesting step comprising providing request(s) for the provider objects to the provider system, the request(s) being generated and/or altered based on options associated with the provider system, the options to narrow a number of the one or more provider objects requested via the one or more requests. The intermediation server receives, from the provider system, the provider object(s) including the identifier(s) and the price estimates thereof. The intermediation server: provides, to a client device, the one or more provider objects; and/or stores the one or more provider objects.

18 Claims, 8 Drawing Sheets

DEVICE, SYSTEM AND METHOD FOR REPRODUCING A REQUESTING STEP BETWEEN A CLIENT DEVICE AND A PROVIDER SYSTEM AT AN INTERMEDIATION SERVER

FIELD

The specification relates generally to intermediation between devices, and specifically to a device, system and method for reproducing a requesting step between a client device and a provider system at an intermediation server.

BACKGROUND

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the extensible Markup Language (XML)-based New Distribution Capability (NDC) standard in the context of travel-related products), they may nonetheless employ different mechanisms to initiate the exchange of data. However, certain mechanisms may result in increased bandwidth usage and/or increased use of processing resources between components of a system that exchanged data with regards to provisioning of various products.

SUMMARY

A first aspect of the specification provides a method comprising: reproducing, via an intermediation server, a requesting step for one or more provider objects, including requesting of identifiers and price estimates thereof, a provider object representing at least one item provided by a provider system, the reproducing of the requesting step comprising providing one or more requests for the one or more provider objects to the provider system, the one or more requests being one or more of generated and altered based on options associated with the provider system as stored at one or more memories, the options to narrow a number of the one or more provider objects requested via the one or more requests; receiving, at the intermediation server, from the provider system, the one or more provider objects including the identifiers and the price estimates thereof; and, one or more of: providing, from the intermediation server, to a client device, the one or more provider objects, and storing, via the intermediation server, at the one or more memories, the one or more provider objects.

At the first aspect, reproducing the requesting step may occur in an absence of a previous requesting step by the client device.

At the first aspect, the method may further comprise: receiving a communication from the client device that includes details used to generate the one or more requests; implementing the reproducing the requesting step in response to receiving the communication; in response to receiving the one or more provider objects from the provider system, and based on historical data associated with the client device, requesting, from the provider system, specific details of a given provider object of the one or more provider objects, the specific details including a firm price thereof, the specific details requested using a respective identifier of the given provider object; and implementing the providing, to the client device, the one or more provider objects and the identifiers of the one or more provider objects by: providing, to the client device, the specific details of the given provider object. In these examples, the communication may be received in the absence of a previous requesting step by the client device, the communication lacking any provider object identifiers.

At the first aspect, the method may further comprise: determining that one or more previously received provider objects, stored at the one or more memories, is to be updated; implementing the reproducing the requesting step in response to the determining that the one or more previously received provider objects are to be updated; and implementing the storing, at the one or more memories, of the one or more provider objects by: replacing, at the one or more memories, the one or more previously received provider objects with the one or more provider objects.

At the first aspect, the method may further comprise: receiving a communication from the client device that includes details used to generate the one or more requests; selecting, from the one or more memories, using the details, one or more generic provider object descriptions; implementing the reproducing the requesting step in response to implementing the selecting of the one or more generic provider object descriptions, the one or more generic provider object descriptions also used to narrow the number of the one or more provider objects requested via the one or more requests; and implementing the providing, to the client device, of the one or more provider objects and the identifiers of the one or more provider objects. In these examples, the communication may be received in the absence of a previous requesting step by the client device, the communication lacking any provider object identifiers.

At the first aspect, the method may further comprise: in response to receiving the one or more provider objects from the provider system, and based on historical data associated with the client device, further narrowing the number of the one or more provider objects that are one or more of provided to the client device and stored at the one or more memories.

At the first aspect, the options may be based on prepopulated information that is one or more of received from the provider system and associated with the provider system, the options comprising provider object types that are one or more of available and not available from the provider system.

At the first aspect, the method may further comprise: determining a respective number of the one or more requests to provide based on historical data associated with the provider system. In these examples, the historical data may be indicative of speed of the provider system when previously responding to historical provider object requests.

A second aspect of the specification provides an intermediation server comprising: a communication interface; and a controller configured to: reproduce a requesting step for one or more provider objects, including requesting of identifiers and price estimates thereof, a provider object representing at least one item provided by a provider system, reproducing of the requesting step comprising providing one or more requests for the one or more provider objects to the provider system, the one or more requests being one or more of generated and altered based on options associated with the provider system as stored at one or more memories, the options to narrow a number of the one or more provider objects requested via the one or more requests; receive, via the communication interface, from the provider system, the one or more provider objects including the identifiers and the price estimates thereof; and, one or more of: provide, via the communication interface, to a client device, the one or more provider objects, and store, at the one or more memories, the one or more provider objects.

At the second aspect, reproducing the requesting step may occur in an absence of a previous requesting step by the client device.

At the second aspect, the controller may be further configured to: receive a communication from the client device that includes details used to generate the one or more requests; implement reproducing the requesting step in response to receiving the communication; in response to receiving the one or more provider objects from the provider system, and based on historical data associated with the client device, request, from the provider system, specific details of a given provider object of the one or more provider objects, the specific details including a firm price thereof, the specific details requested using a respective identifier of the given provider object; and implement providing, to the client device, the one or more provider objects and the identifiers of the one or more provider objects by: providing, to the client device, the specific details of the given provider object. In some of these examples, the communication may be received in the absence of a previous requesting step by the client device, the communication lacking any provider object identifiers.

At the second aspect, the controller may be further configured to: determine that one or more previously received provider objects, stored at the one or more memories, is to be updated; implement reproducing the requesting step in response to the determining that the one or more previously received provider objects are to be updated; and implement storing, at the one or more memories, of the one or more provider objects by: replacing, at the one or more memories, the one or more previously received provider objects with the one or more provider objects.

At the second aspect, the controller may be further configured to: receive a communication from the client device that includes details used to generate the one or more requests; select, from the one or more memories, using the details, one or more generic provider object descriptions; implement reproducing the requesting step in response to implementing selecting the one or more generic provider object descriptions, the one or more generic provider object descriptions also used to narrow the number of the one or more provider objects requested via the one or more requests; and, implementing the providing, to the client device, of the one or more provider objects and the identifiers of the one or more provider objects. In some of these examples, the communication may be received in the absence of a previous requesting step by the client device, the communication lacking any provider object identifiers.

At the second aspect, the controller may be further configured to: in response to receiving the one or more provider objects from the provider system, and based on historical data associated with the client device, further narrow the number of the one or more provider objects that are one or more of provided to the client device and stored at the one or more memories.

At the second aspect, the options may be based on prepopulated information that is one or more of received from the provider system and associated with the provider system, the options comprising provider object types that are one or more of available and not available from the provider system.

At the second aspect, the controller may be further configured to: determine a respective number of the one or more requests to provide based on historical data associated with the provider system. In some of these examples, the historical data may be indicative of speed of the provider system when previously responding to historical provider object requests.

A third aspect of the specification provides a non-transitory computer-readable medium storing a computer program, wherein execution of the computer program is to implement a method comprising: reproducing, via an intermediation server, a requesting step for one or more provider objects, including requesting of identifiers and price estimates thereof, a provider object representing at least one item provided by a provider system, the reproducing of the requesting step comprising providing one or more requests for the one or more provider objects to the provider system, the one or more requests being one or more of generated and altered based on options associated with the provider system as stored at one or more memories, the options to narrow a number of the one or more provider objects requested via the one or more requests; receiving, at the intermediation server, from the provider system, the one or more provider objects including the identifiers and the price estimates thereof; and, one or more of: providing, from the intermediation server, to a client device, the one or more provider objects, and storing, via the intermediation server, at the one or more memories, the one or more provider objects.

At the third aspect, reproducing the requesting step may occur in an absence of a previous requesting step by the client device.

At the third aspect, the method may further comprise: receiving a communication from the client device that includes details used to generate the one or more requests; implementing the reproducing the requesting step in response to receiving the communication; in response to receiving the one or more provider objects from the provider system, and based on historical data associated with the client device, requesting, from the provider system, specific details of a given provider object of the one or more provider objects, the specific details including a firm price thereof, the specific details requested using a respective identifier of the given provider object; and implementing the providing, to the client device, the one or more provider objects and the identifiers of the one or more provider objects by: providing, to the client device, the specific details of the given provider object. In these examples, the communication may be received in the absence of a previous requesting step by the client device, the communication lacking any provider object identifiers.

At the third aspect, the method may further comprise: determining that one or more previously received provider objects, stored at the one or more memories, is to be updated; implementing the reproducing the requesting step in response to the determining that the one or more previously received provider objects are to be updated; and implementing the storing, at the one or more memories, of the one or more provider objects by: replacing, at the one or more memories, the one or more previously received provider objects with the one or more provider objects.

At the third aspect, the method may further comprise: receiving a communication from the client device that includes details used to generate the one or more requests; selecting, from the one or more memories, using the details, one or more generic provider object descriptions; implementing the reproducing the requesting step in response to implementing the selecting of the one or more generic provider object descriptions, the one or more generic provider object descriptions also used to narrow the number of the one or more provider objects requested via the one or more requests; and implementing the providing, to the client device, of the one or more provider objects and the identifiers of the one or more provider objects. In these examples, the communication may be received in the absence of a previous requesting step by the client device, the communication lacking any provider object identifiers.

At the third aspect, the method may further comprise: in response to receiving the one or more provider objects from the provider system, and based on historical data associated with the client device, further narrowing the number of the one or more provider objects that are one or more of provided to the client device and stored at the one or more memories.

At the third aspect, the options may be based on prepopulated information that is one or more of received from the provider system and associated with the provider system, the options comprising provider object types that are one or more of available and not available from the provider system.

At the third aspect, the method may further comprise: determining a respective number of the one or more requests to provide based on historical data associated with the provider system. In these examples, the historical data may be indicative of speed of the provider system when previously responding to historical provider object requests.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
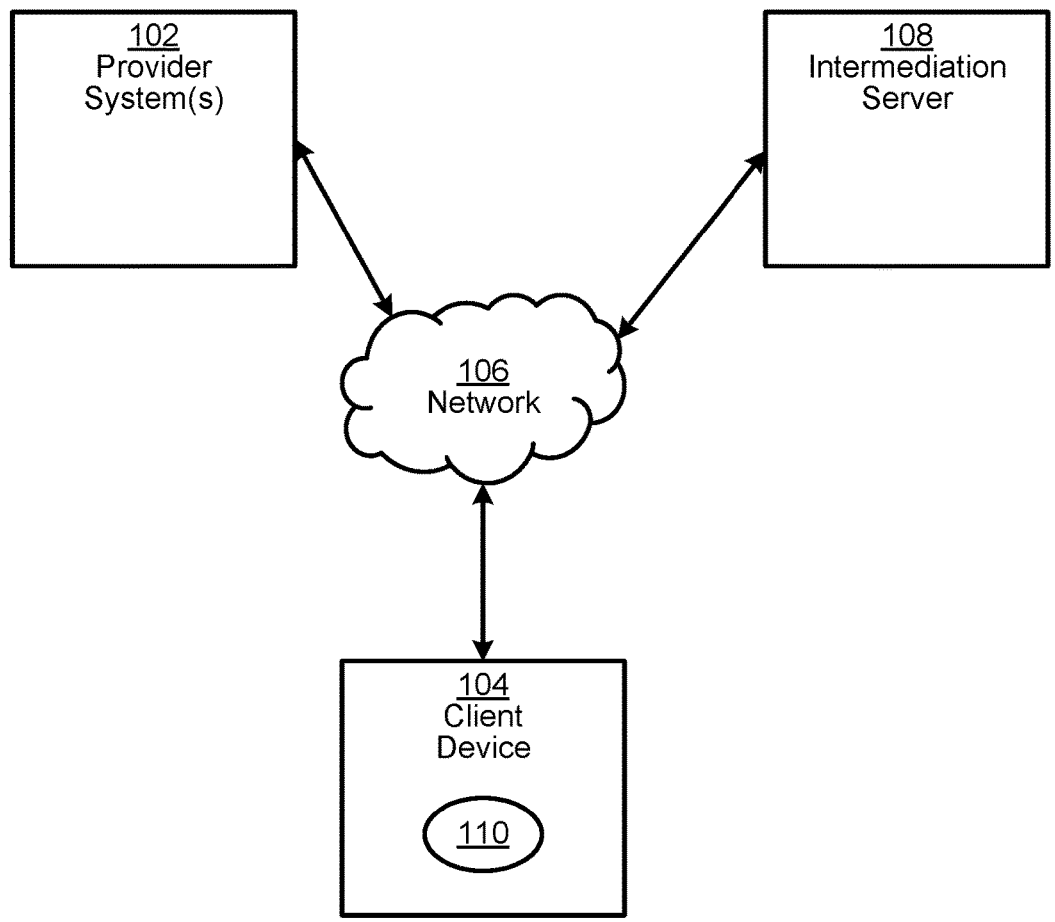
FIG. 1 depicts a system for reproducing a requesting step between a client device and a provider system at an intermediation server, according to non-limiting examples.

FIG. 1 depicts a system 100 for intermediation between a provider system (e.g. one or more servers or other suitable computing devices), and a client device. Provider objects, in the examples discussed herein, may comprise provider objects and/or data records which correspond to products and/or items, such as travel-related goods and services (e.g. flights, hotel reservations, car rentals and the like), provided by a provider system. More specifically, the products and/or items discussed in the examples below may be flight tickets and related services (e.g. limo pickup services, excursions at a destination, baggage check services, in-flight food, entertainment, pet-related services, and the like). However, as will be apparent to those skilled in the art, the systems and methods discussed below can also be applied to various other types of data objects and/or items including, but not limited to, data objects correspond to any suitable products and/or any suitable items available (e.g. for purchase, and the like) from any suitable website, and the like.

Delivery of the items mentioned above is typically controlled by a provider entity, such as an airline in the case of the items discussed in connection with the travel-industry related examples provided herein. The system 100 includes one or more provider systems 102 (e.g. one or more servers or other suitable computing devices), which in this example is operated by one or more provider entities. The system 100 can include a plurality of client devices 104, although only one client device 104 is shown in FIG. 1 for illustrative purposes.

The system 100 can include a plurality of provider systems 102, each operated by respective provider entities (e.g. various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g. by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g. data fields), and the like. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g. any suitable combination of local and wide area networks, including the Internet) and via an intermediation server 108. As will be described below, the intermediation server 108 generally intermediates between the client device 104 and the provider system 102, for example such that the client device 104 may request products from the provider system 102, and/or more than one provider system 102, via the intermediation server 108.

Furthermore, in some examples, the intermediation server 108 may convert data between formats associated with provider systems 102 and the client device 104. For example, a first provider system 102 may communicate and/or provide provider objects, and/or offers for provider objects, according to a first format, and a second provider system 102 may communicate and/or provide provider objects, and/or offers for provider objects, according to a second format (e.g. which may be the same or different from the first format). Neither format may be compatible with a format used by the client device 104 to communicate. As such, the intermediation server 108 may convert data received in different formats from the provider system 102, to a format compatible with the client device 104, and vice versa.

The client device 104, in the present example, may be operated by a travel agent entity, and therefore generates and provides requests for provider objects (e.g. representing products which may be for purchase), and/or requests to purchase products (e.g. represented by the provider objects), to the provider system 102, via the intermediation server 108, on behalf of end users (e.g. travelers).

Hence, in one example, the intermediation server 108 may comprise an aggregator server which communicates with a plurality of provider systems 102 and aggregates provider objects and/or offers for provider objects from the plurality of provider systems 102, to provide to the client device 104. When formats of data used by the provider systems 102 and the client device 104 are compatible, the intermediation server 108 may not perform the conversions described herein when performing the aggregation functionality.

Alternatively, a client device 104 may be operated by a provider system 102. In yet another alternative, a provider system 102 may operate the intermediation server 108. Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g. such as via the network 106), herein communication between components of the system 100 is referred to as the components providing data, and the like, therebetween which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108. Various mechanisms for the creation of provider objects will be apparent to those skilled in the art, such as the "offer" and "order" mechanisms specified by the NDC standard.

The client device 104 is configured to receive data contained in the provider objects via the intermediation server 108. Data obtained by the client device 104, via the intermediation server 108, may be presented to users served by the client device 104, for example via a display screen (not depicted) which may be local to the client device 104; further information associated with the items represented by the provider objects may be requested by the client device 104 which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108.

The provider objects provided by the provider system 102 generally include provider object data representing at least one item provided by the provider system 102. In some examples, the provider object data may include a provider object identifier and/or provider object identifier data, that identifies the provider object to the provider system 102. The provider object data generally comprises information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In general, communication between the client device 104 and the intermediation server 108 occurs via a computing-process flow 110 implemented by the client device 104, such as an Applications Programming Interface (API), and the like. For example, during ordering of a provider object (e.g. booking a flight), the client device 104 may implement the computing-process flow 110 in the form of an API, and communications between the client device 104 and the intermediation server 108 may be defined by the API.

Figure 3:
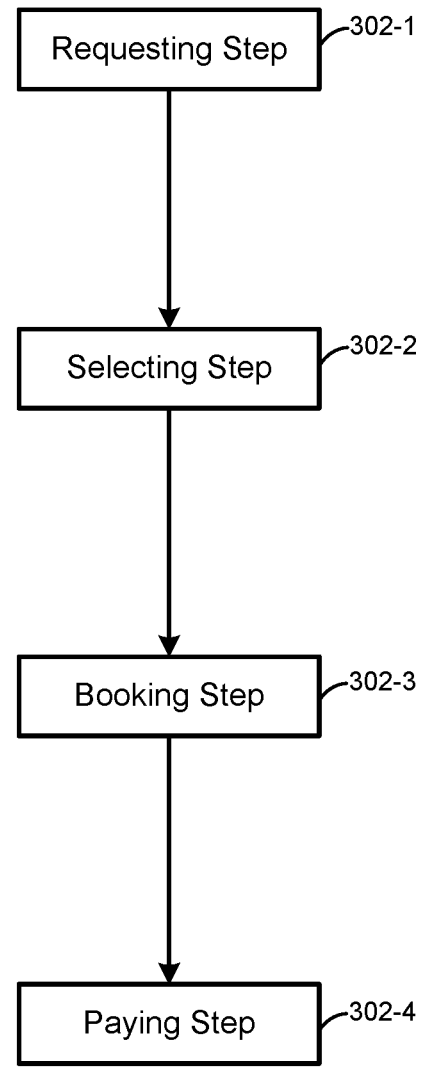
FIG. 3 depicts a computing-process flow of the system of FIG. 1, according to non-limiting examples.

Regardless, the steps of offering and ordering a provider object may occur according to a predefined series of steps, which are discussed in more detail with respect to FIG. 3 but which may include a requesting step, a selecting step, a booking step and a paying step. It is understood, however, that such steps are not meant to be exhaustive, and other steps may occur in in the computing-process flow 110. However, the requesting step, in which the client device 104 may request provider objects from one or more provider systems 102 via the intermediation server 108, may cause undo network traffic at a provider system 102 when the system 100 is configured such the provider system 102 responds to each request for provider objects. In particular, in some examples, provider systems 102 may publish (e.g. at a server), and/or make available to the intermediation server 108, information describing various provider objects (e.g. such as flight schedules, fares, airline rules, flight availability data and the like), which may enable the intermediation server 108 to generate the provider objects. Alternatively, the intermediation server 108 may maintain a cache, and the like, of information describing various provider objects, including, but not limited to, seat availabilities on various flights (e.g. when the provider objects represent seats on flights, and the like). In these examples, at the requesting step, the intermediation server 108 may respond to the client device 104 request for provider objects using such information (e.g. the intermediation server 108 may generate and provide provider objects to the client device 104), without explicitly querying a provider system 102. Such responses by the intermediation server 108 may occur in response to GDS-type queries and/or requests from the client device 104; however, such responses are understood to be generic and/or non-customized; furthermore, such responses may be in a GDS format.

However, in NDC-based data exchanges, NDC offers (e.g. offers for provider objects) may be based on options that are associated with a provider system 102; such options may specify various factors that may be used a provider system 102 to respond to a request for provider objects, and may include, but are not limited to (e.g. using travel-based examples), destinations and/or airports serviced the provider system 102, connecting airports used by the provider system 102, baggage-related factors used by the provider system 102, and the like, amongst other possibilities. Hence, in NDC-based data exchanges, NDC offers may be customized according to various factors.

Hence, it is further understood that, in some examples, the intermediation server 108 and/or one or more of the provider systems 102 operate according to an NDC standard.

However, while in NDC-based data exchanges, a provider system 102 may receive thousand to millions to hundreds of millions (and sometimes higher) requests per day, very few may result in a client device 104 booking and/or purchasing, and the like, a provider object. Such a situation may lead to a large waste of bandwidth between the components of the system 100 and/or a large waste of processing resources at the provider system 102.

It is further understood that, to address this issue, the intermediation server 108 is generally configured to reproduce (e.g. simulate and/or imitate, and the like) a requesting step for one or more provider objects, including requesting of identifiers and price estimates thereof, for example by providing one or more requests for the one or more provider objects to a provider system 102, the one or more requests being one or more of generated and altered based on options, associated with the provider system 102, as stored at one or more memories, the options to narrow a number of the one or more provider objects requested via the one or more requests. In particular, such a narrowing of the number of the one or more provider objects requested via the one or more requests may reduce use of processing resources at the provider system 102 when responding to the one or more requests. In particular, while provider objects may be customized, such customization may be similar and/or the same for different requests (e.g. from the client device 104 and/or different client devices 104), and hence narrowing and/or restricting searches for provider objects at the provider system 102 may save bandwidth between the provider system 102 and the intermediation server 108, as well as processing resources at the provider system 102.

The intermediation server 108 may receive the provider objects from the provider system 102 and store them, such that, when a request for a provider object that has been stored is received from the client device 104, the intermediation server 108 may retrieve the provider object from the one or more memories rather than again request the provider object from the provider system 102. Alternatively, the provider objects from the provider system 102 may be provided to a client device 104, for example in response to a data exchange with the intermediation server 108 that occurs at a selecting step, described in more detail below.

Figure 2:
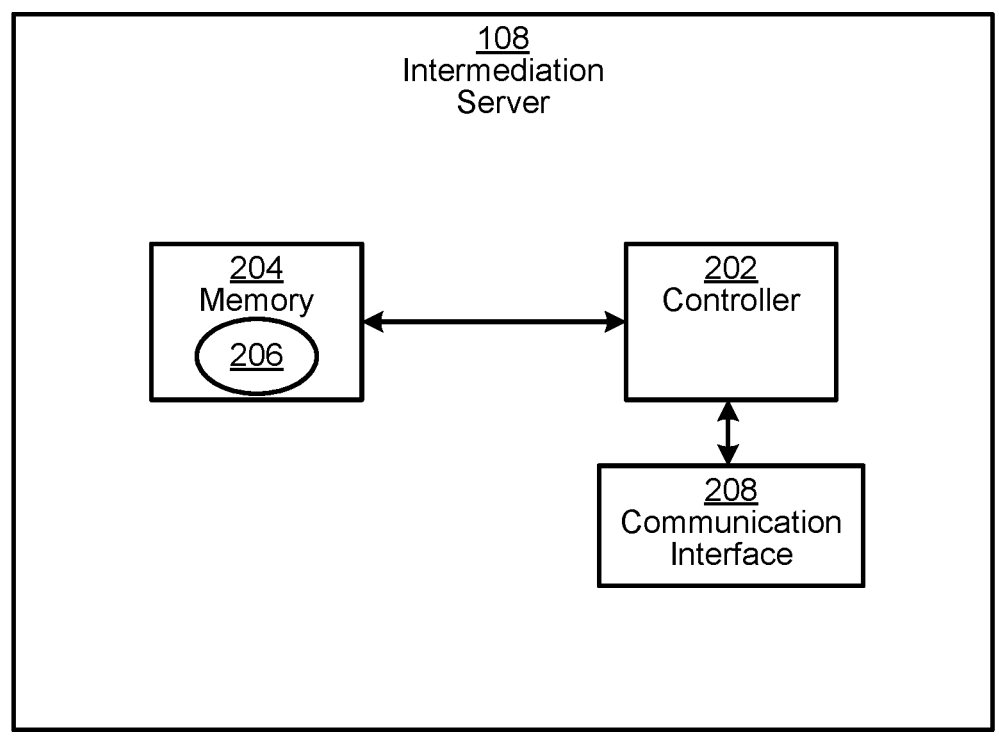
FIG. 2 depicts an intermediation server for reproducing a requesting step between a client device and a provider system at an intermediation server, according to non-limiting examples.

Turning to FIG. 2, before discussing the functionality of the system 100 in greater detail, certain components of the intermediation server 108 will be discussed in greater detail. While depicted as one device, the intermediation server 108 may comprise one or more computing devices and/or one or more cloud computing devices that may be geographically distributed.

As shown in FIG. 2, the intermediation server 108 includes at least one controller 202, such as a central processing unit (CPU) or the like. The controller 202 is interconnected with a memory 204 storing an application 206, the memory 204 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the intermediation server 108 to communicate with the other computing devices of the system 100 (i.e. the provider systems 102 and the client device 104) via the network 106, though it is understood such communication may occur locally when components of the system 100 are combined. The communication interface 208 therefore may include any necessary components (e.g. network interface controllers (NICs), radio units, and the like) to communicate via the network 106. The specific components of the communication interface 208 may be selected based on upon the nature of the network 106 and/or local communication between components of the system 100, and the like. The intermediation server 108 can also include input and output devices connected to the controller 202, such as keyboards, mice, displays, and the like (not shown).

The components of the intermediation server 108 mentioned above can be deployed in a single enclosure, or in a distributed format. In some examples, therefore, the intermediation server 108 includes a plurality of processors, either sharing the memory 204 and communication interface 208, or each having distinct associated memories and communication interfaces. As such, it is understood that the memory 204, and/or a portion of the memory 204, may be internal (e.g. as depicted) or external to the intermediation server 108; regardless, the controller 202 is understood to have access to the memory 204.

The memory 204 also stores a plurality of computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein. In the description below, the controller 202, and more generally the intermediation server 108, are said to be configured to perform those actions. It will be understood that they are so configured via the execution (by the controller 202) of the instructions of the applications stored in memory 204.

In some examples, execution of the application 206, as will be discussed below, configures the intermediation server 108 to implement functionality for reproducing a requesting step to provision provider objects at the intermediation server 108, including but not limited to, the blocks of a method set forth in FIG. 5.

As will be described in more detail below, in some examples, the application 206 may comprise one or more machine learning algorithms trained to implement functionality for reproducing a requesting step to provision provider objects at the intermediation server 108, including but not limited to, the blocks of a method set forth in FIG. 5. However, alternatively, or in addition, the application 206 may comprise one or more programmatic algorithms.

While structure of the provider system 102 and the client device 104 is not described in detail, the provider system 102 and the client device 104 are understood to have a similar structure as the intermediation server 108, but adapted for the functionality of the provider system 102 and the client device 104.

Attention is next directed to FIG. 3 which depicts a block diagram of an example of the computing-process flow 110. While the example computing-process flow 110 is depicted in the form of a flow chart, it is understood that the example computing-process flow 110 (e.g. hereafter the computing-process flow 110) may show steps of an API that include steps 302-1, 302-2, 302-3, 302-4 are hereafter interchangeably referred to, collectively, as the steps 302 and, generically, as a step 302. This convention will be used throughout the present specification.

For example, at the requesting step 302-1, a user of the client device 104 may enter criteria and/or details at data fields of a GUI used for searching for provider objects representing flights, such as a date (e.g. and time) for a flight, a departure airport, an arrival airport, among other possibilities; the criteria may be provided to the intermediation server 108, and the intermediation server 108 may provide the criteria and/or details to the provider systems 102. The provider systems 102 may return respective offers of provider objects representing flights that meet the criteria and/or details. In general, such offers of provider objects may be customized based on options associated with a provider system 102. The intermediation server 108 may aggregate offers of provider objects from a plurality of provider systems 102 and return the offers of provider objects to the client device 104. In NDC-based data exchanges, it is understood that the offers may be identified by respective offer identifiers (e.g. which may be referred to as OfferIds and/or an OfferID).

At the selecting step 302-2, a list of offers of the provider objects representing the flights returned by the provider systems 102, via the intermediation server 108, may be provided in a GUI at a display screen associated with the client device 104, and from which a user of the client device 104 may select, for example, a flight to book; in some examples, the user of the client device 104 may select electronic buttons, and the like to add a service to an offer and/or a provider object, such as a pickup service. At the selecting step 302-2, the client device 104 may request a "firm" offer for the selected provider object, such as a "firm" and/or finalized price, which may be different from a "published" price. Any suitable exchanges of data via the network 106 between the client device 104, the intermediation server 108, and the provider system 102 are understood to occur to select, request and receive the firm offer of the provider object, however such data exchanges are understood to be based on the aforementioned offer identifiers when such data exchanges comprise NDC-based data exchanges (e.g. using an offer identifier of a selected offer).

Similarly, at the booking step 302-3, information for a selected provider object, such as the aforementioned flight, may be provided in a GUI at a display screen, and from which a user of the client device 104 may select electronic buttons to pay for the flight, and/or to add a service to a booking, such as a pickup service, and the like. Any suitable exchanges of data via the network 106 between the client device 104, the intermediation server 108, and the provider system 102 are understood to occur to book the firm offer of the provider object however such data exchanges are understood to be based on the aforementioned offer identifiers when such data exchanges comprise NDC-based data exchanges.

Similarly, at the paying step 302-4, fields for entering payment information, such as credit card information, to pay for a selected flight being booked may be provided in a GUI at a display screen. Any suitable exchanges of data via the network 106 between the client device 104, the intermediation server 108, and the provider system 102 are understood to occur to pay for the firm offer of the provider object.

While the steps 302 may all be implemented to purchase a provider object (e.g. a flight represented by a provide object), the requesting step 302-1 may be implemented many tens to hundreds to thousands of times (or higher) for instances of the remaining steps 302. For example, users of a client device 104 may request and review many provider objects before selecting and/or booking and/or paying for a provider object; indeed, users of a client device 104 may request and review many provider objects and never select and/or book and/or pay for a provider object. Furthermore, users of different client devices 104 may request provider objects at respective requesting steps 302-1 using similar and/or the same criteria, which may result in the provider system 102 providing similar and/or same provider objects to the client devices 104 (e.g. presuming the client devices 104 and/or requests received at a requesting step 302-2 meet same or similar options and/or factors associated with a provider system 102 providing the provider objects).

Figure 4:
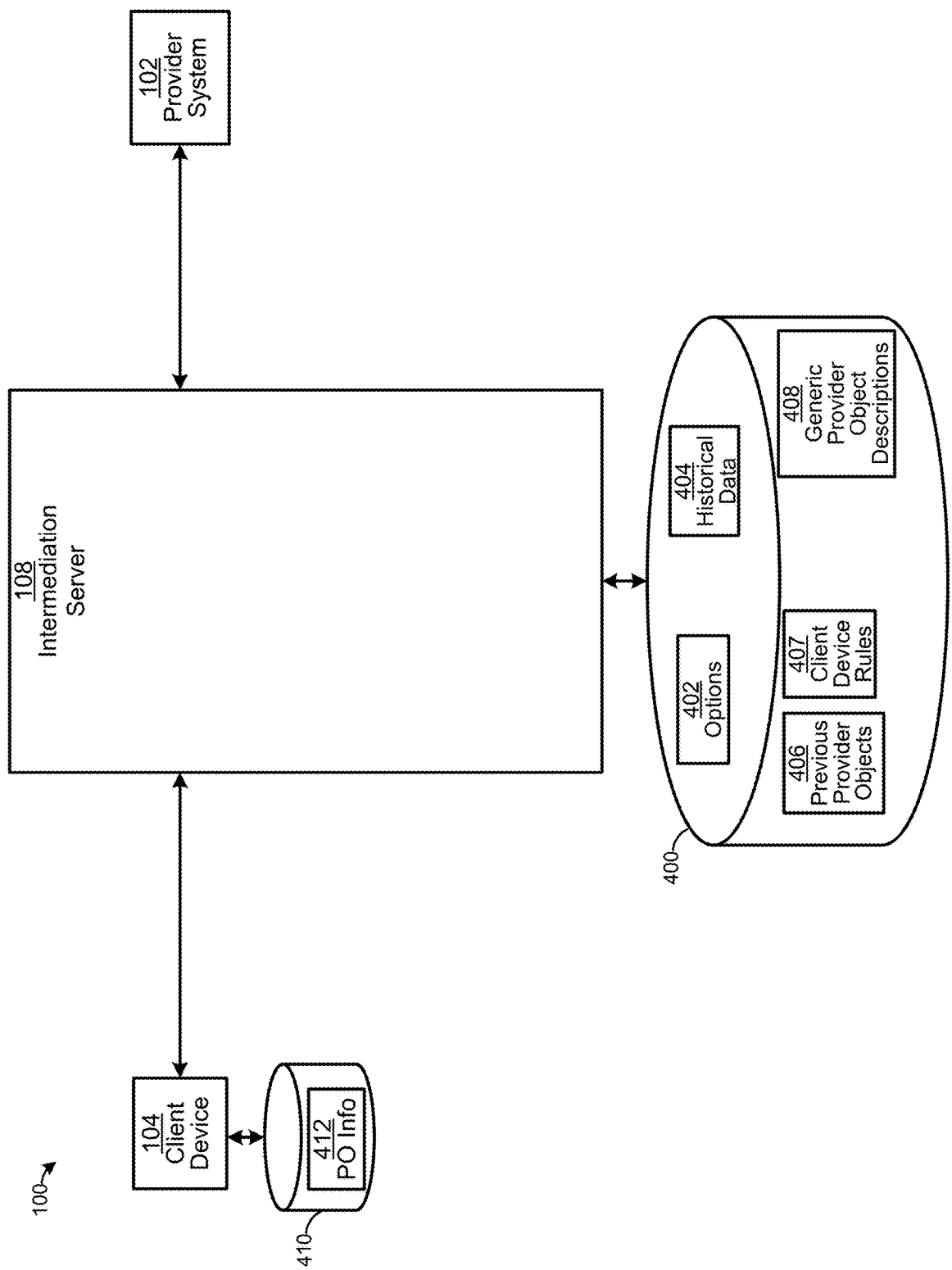
FIG. 4 depicts the system of FIG. 1 in further detail, according to non-limiting examples.

Attention is now directed to FIG. 4 which illustrates one example of the system 100 that includes one provider system 102, one client device 104 and the intermediation server 108 intermediating therebetween. While the network 106 is not depicted, it is nonetheless understood to be present. For example, communication links between components of the system 100 are depicted in FIG. 4, and throughout the present specification, as double-ended arrows between respective components; the communication links may include any suitable combination of wireless and/or wired links and/or wireless and/or wired communication networks including, but not limited to, the network 106.

Also depicted in FIG. 4 is a memory 400 to which the intermediation server 108 has access. While depicted in the form of a database, the memory 400 may comprise one or more suitable memories 400 at which provider objects (e.g. in form of offers for provider objects, and/or in any other suitable format) may be stored. The memory 400, which may be referred to hereafter interchangeably as one or more memories 400, may be separate from the intermediation server 108 and/or at least partially integrated with the intermediation server 108, for example at the memory 204.

As depicted, the memory 400 stores options 402 associated with the provider system 102. While only one provider system 102 and one set of associated options 402 are depicted, the memory 400 may store a set of options 402 for each of a plurality of provider systems 102 with which the intermediation server 108 is in communication. The options 402 are generally understood to be based on prepopulated information received from, and/or associated with, the provider system 102; for example, the options 402 may comprise provider object types that are one or more of available and not available from the provider system 102. For example, the options 402 may specify various rules that the provider system 102 may use to respond to requests for provider objects at the requesting step. In examples where the application 206 comprises one or more machine learning algorithms, the options 402 may comprise machine learning classifiers that may be used to generate requests for provider objects from the provider system 102 based on various factors used as input to the one or more machine learning algorithms, such as details of one or more items and/or flights as received from the client device 104, details of previous provider objects stored at the one or more memories 400 (e.g. previous provider objects 406 described below), and the like.

In one specific non-limiting example, the options 402 may indicate that the provider system 102 provides flights only between certain destinations and/or not between other destinations. In another specific non-limiting example, the options 402 may indicate that the provider system 102 provides flights only between certain airports and/or not between other airports; for example, while the provider system 102 may provide flights to and/or from a given city, which may have a plurality of airports, and the options 402 may indicate that the provider system 102 provides flights only to one of the airports, and not another of the airports (e.g. to or from Charles De Gaulle Airport in Paris, but not to or from Orly Airport in Paris). In another specific non-limiting example, the options 402 may indicate that the provider system 102 provides stopovers and/or connecting flights only via certain airports, and/or not other airports (e.g. via JFK Airport in New York City but not Pierre Trudeau Airport in Montreal). In yet another specific non-limiting example, the options 402 may indicate that the provider system 102 provides flights that include one checked bag, but does not offer flights that excludes a checked bag (e.g. at a cheaper fare). Put another way, the options 402 may comprise a set of rules and/or machine learning classifiers that correspond to rules internal to the provider system 102 applied when searching for flights when requests are received at the requesting step 302-1.

Put another way, the options 402 may specify provider object types that are one or more of available and not available from the provider system 102. Continuing with the above travel-related examples, the options 402 may indicate that types of provider objects that correspond to flights between certain destinations are available from the provider system 102, and/or the options 402 may indicate that other types of provider objects that correspond to flights between other certain destinations are not available from the provider system 102.

Similarly, the options 402 may indicate that types of provider objects that correspond to flights that include stopovers and/or connecting flights at certain airports are available from the provider system 102, and/or the options 402 may indicate that other types of provider objects that correspond to flights that include stopovers and/or connecting flights at other certain airports are not available from the provider system 102.

Similarly, the options 402 may indicate that types of provider objects that correspond to flights that include a checked bag are available from the provider system 102, and/or the options 402 may indicate that other types of provider objects that correspond to flights that do not include a checked bag are not available from the provider system 102.

However, the options 402 may include any suitable type of rule and/or machine learning classifier and/or any suitable type of provider object and/or any suitable indication of any suitable type of provider object, and the like.

In general, as will be described in more detail below, the options 402 may be used to narrow criteria for requests for provider objects provided to the provider system 102 when the intermediation server 108 reproduces the requesting step 302-1 for one or more provider objects. Put another way, when the intermediation server 108 reproduces the requesting step 302-1 for one or more provider objects, the intermediation server 108 may include requests generated according to the options 402, for example to include criteria in the requests that correspond to provider object types offered by the provider system 102, and/or to exclude criteria in the requests that correspond to provider object types not offered by the provider system 102.

In some examples, the options 402 may be explicitly based on information that is received from the provider system 102 (e.g. a set of rules and/or provider object types). However, in other examples, the intermediation server 108 may derive the options 402 based on previous requests received from the client device 104 and corresponding provider objects returned from the provider system 102, which may be stored as historical data 404 at the memory 400; for example, the intermediation server 108 may process requests of the historical data 404 and corresponding provider objects received from the provider system 102 in response to the request to determine the options 402.

In particular, the historical data 404 may be used to train a machine learning algorithm of the application 206. For example, requests received from the client device 104 may be used as training input and corresponding provider objects returned from the provider system 102 may be used as training output to generate the options 402, and in particular machine learning classifiers thereof.

Similarly, as depicted, the memory 400 may further store previous provider objects 406 that were received from the provider system 102, which may be stored with the historical data 404 and/or separate from the historical data 404. For example, the previous provider objects 406 may comprise the aforementioned training output to generate the options 402, however the training output to generate the previous provider objects 406 may alternatively be stored as a cache of provider objects that may be searched by the intermediation server 108 to respond to requests from the client device 104.

However, the historical data 404 may store historical data 404 associated with the client device 104, for example with respect to the selecting step 302-2 (or similar), the booking step 302-3 (or similar), and/or the paying step 302-4 (or similar). For example, the historical data 404 associated with the client device 104 may be used to narrow a number of provider objects that are one or more of provided to the client device 104 and stored at the one or more memories 400, for example in conjunction with implementing the method described below with respect to FIG. 5. For example, the historical data 404 may indicate that the client device 104 generally selects and/or books cheapest flights, and/or flights with no stopovers, or more expensive flights with premium services associated, such as lounge passes, and the like. Hence, it is understood that certain provider objects may correspond to flights that have such premium services associated therewith.

In particular, as depicted, the historical data 404 may be used to generate client device rules 407 which may comprise rules and/or machine learning classifiers, and the like, for narrowing a number of provider objects that are one or more of provided to the client device 104 and stored at the one or more memories 400. In an example, the client device rules 407 may indicate that only a given number of provider objects (e.g. such as 10 provider objects) representing the cheapest items represented by the provider objects, are to be one or more of provided to the client device 104 and stored at the one or more memories 400. In another example, the client device rules 407 may indicate that only a given number of provider objects (e.g. such as 10 provider objects) representing expensive flights with premium services associated, such as lounge passes, are to be one or more of provided to the client device 104 and stored at the one or more memories 400. However, the client device rules 407 may indicate any "preferences" associated with the client device 104 as indicated by the historical data 404 (and/or any other suitable data).

In particular, the historical data 404 may be used to train a machine learning algorithm of the application 206. For example, selecting requests and/or booking requests and/or paying requests received from the client device 104 may be used as training input and corresponding provider objects that are selected and/or booked and/or paid for may be used as training output to generate the client device rules 407, and in particular machine learning classifiers thereof.

As depicted, the memory 400 further stores generic provider object descriptions 408. Such generic provider object descriptions 408 may comprise example and/or generic travel itineraries that may exclude flight details, but may include estimates of prices of flights, and the like. Use of the generic provider object descriptions 408 is described in more detail below, however it is understood that the generic provider object descriptions 408 may indicate "popular" itineraries which may be based on the historical data 404. For example, the generic provider object descriptions 408 may indicate that flights between two destinations and/or airports having morning departure times (e.g. between 06:00 and 12:00) are most popular, whereas afternoon flights and/or overnight flights are not popular. Determination of such popularity may be based on threshold numbers of bookings of flights, and the like; for example when morning flights between two destinations are booked first 90% of the time, relative to afternoon flights and/or overnight flights, the morning flights may be determined to be most popular, and generic provider object descriptions 408 may store "itineraries" for morning flights between the two destinations but not "itineraries" for afternoon or overnight flights. In some examples, the generic provider object descriptions 408 may be more specific and may, for example, indicate an itinerary for flights between two destinations with departure times between 07:30 and 08:30.

In a particular example, a generic provider object description 408 may comprise information and/or an "itinerary" of flights from Toronto to Paris with departure times between 06:00 and 12:00. In a simple example, such a generic provider object description 408 may comprise: "Originating City: Toronto; Destination City: Paris; Departure Time Range: 06:00 to 12:00". The generic provider object descriptions 408 may omit other itineraries between these two destinations to indicate that the stored itinerary is the most popular. However any suitable format for any suitable itineraries for the generic provider object descriptions 408 are within the scope of the present specification.

It is hence understood that the generic provider object descriptions 408 are referred to herein as "generic" as they generically and/or generally describe a set of criteria that may be met by some provider objects, but do not describe a specific provider object.

As depicted, the client device 104 is in communication with a memory 410 (e.g. as depicted in the form of a database) that stores provider object (e.g. "PO") information 412. The provider object information 412 may comprise provider object information available from the provider system 102 regarding provider objects available from the provider system 102 and may comprise published flight schedules. The provider object information 412 may enable a local search for provider objects to occur at the client device 104, for example in a requesting step that mimics and/or simulates the requesting step 302-2, but without communication with the intermediation server 108 and/or the provider system 102.

Figure 5:
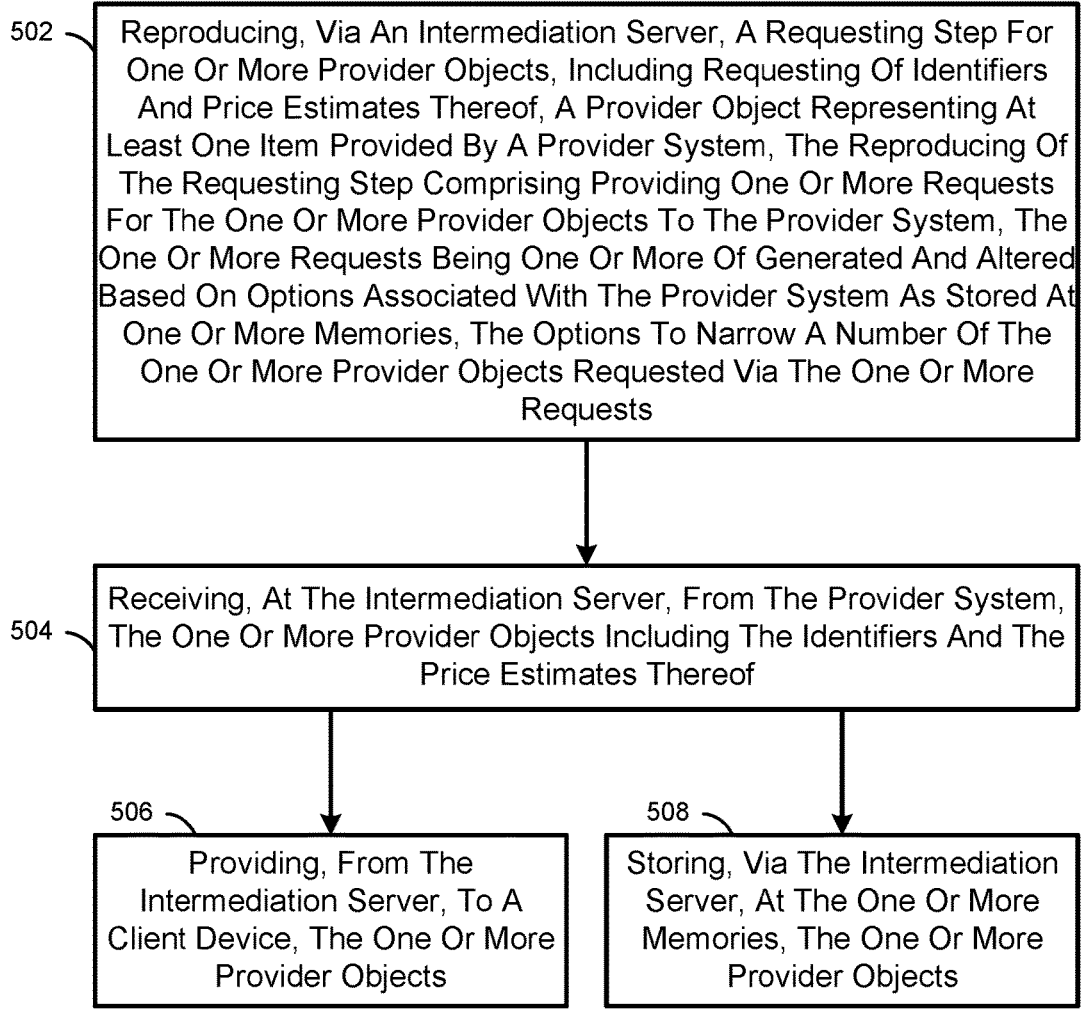
FIG. 5 depicts a flowchart of a method for reproducing a requesting step between a client device and a provider system at an intermediation server, according to non-limiting examples.

Attention is now directed to FIG. 5 which depicts a flowchart representative of a method 500 a method for reproducing a requesting step between a client device and a provider system at an intermediation server according to indications of possible steps associated with respective provider systems. The operations of the method 500 of FIG. 5 correspond to machine readable instructions that are executed by the intermediation server 108, and specifically the controller 202 of the intermediation server 108. In the illustrated example, the instructions represented by the blocks of FIG. 5 are stored at the memory 204 for example, as the application 206. The method 500 of FIG. 5 is one way in which the controller 202 and/or the intermediation server 108 and/or the system 100 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1 and FIG. 4, as well.

It is understood that the method 500 may generally result in fewer requests for provider objects being provided to a provider system 102, thereby reducing bandwidth usage of the system 100.

At a block 502, the controller 202 and/or the intermediation server 108 reproduces a requesting step for one or more provider objects, including requesting of identifiers and price estimates thereof, a provider object representing at least one item provided by a provider system 102, the reproducing of the requesting step comprising providing one or more requests for the one or more provider objects to the provider system 102, the one or more requests being one or more of generated and altered based on the options 402 associated with the provider system 102 as stored at one or more memories 400, the options 402 to narrow a number of the one or more provider objects requested via the one or more requests.

In some examples, at the block 502, reproducing the requesting step may occur in an absence of a previous requesting step 302-1 by the client device 104. However, in other examples, a previous requesting step 302-1 may have occurred according to same and/or similar criteria and/or details as the requesting step that is reproduced at the block 502.

In general, as described above, the options 402 of the block 502 may be based on prepopulated information received from the provider system 102. Furthermore, as described above, the options 402 may comprise provider object types that are one or more of available and not available from the provider system 102. Furthermore, as described above, the options 402 may comprise machine learning classifiers.

In some examples, at the block 502, the controller 202 and/or the intermediation server 108 may determine a respective number of the one or more requests to provide based on the historical data 404 associated with the provider system 102. Such historical data 404 may be indicative of the speed of the provider system 102 when previously responding to historical provider object requests. For example, the historical data 404 may indicate that that the provider system 102 was previously quicker to respond to two separate requests that specified different specific search criteria for flights between two airports (e.g. one request including stopovers, and another request excluding stopovers), rather than one request that specified more generic search criteria for flights between the two cities (e.g. no indication of whether stopovers or no stopovers are being requested). In general, the historical data 404 may be used to optimize a number of requests provided to the provider system 102 at the block 502. Indeed, in these examples, the application 206 may comprise one or more machine learning algorithms trained to determine a number of requests that may result in a fastest response from the provider system 102, such one or more machine learning algorithms trained using numbers and/or types of requests provided to the provider system 102, and times for receiving corresponding responses from the provider system 102.

It is further understood that the block 502 may be initiated under different conditions described in more detail below with respect to FIG. 6, FIG. 7 and FIG. 8.

At a block 504, the controller 202 and/or the intermediation server 108 receives (e.g. via the communication interface 208), from the provider system 102, the one or more provider objects including the identifiers and the price estimates thereof, for example in response to the one or more requests provided at the block 504.

At a block 506, the controller 202 and/or the intermediation server 108 provides (e.g. via the communication interface 208) from the intermediation server, to the client device 104, the one or more provider objects, At a block 508, the controller 202 and/or the intermediation server 108 stores, at the one or more memories 400, the one or more provider objects.

It is understood that, one or more of the blocks 506, 508 may be implemented. In particular, only the block 506 may be implemented, only the block 508 may be implemented, or both the block 506 and the block 508 may be implemented. Whether the block 506 is implemented and/or the block 508 is implemented may depend on a number of factors, described in more detail below with respect to FIG. 6, FIG. 7 and FIG. 8, but which may include, but is not limited to, conditions under which the method 500 was initiated.

In some examples, the method 500 may further comprise, the controller 202 and/or the intermediation server 108: in response to receiving the one or more provider objects from the provider system 102 at the block 504, and based on the historical data 404 associated with the client device 104, further narrowing the number of the one or more provider objects that are one or more of provided to the client device 104 (e.g. at the block 506) and stored at the one or more memories 400 (e.g. at the block 508). For example, as described above, the historical data 404 associated with the client device 104 may indicate that the client device 104 may generally request cheapest flights and hence the narrowing that occurs based on the historical data 404 associated with the client device 104 may include providing and/or storing only the ten cheapest provider objects, or any other suitable number.

Figure 6:
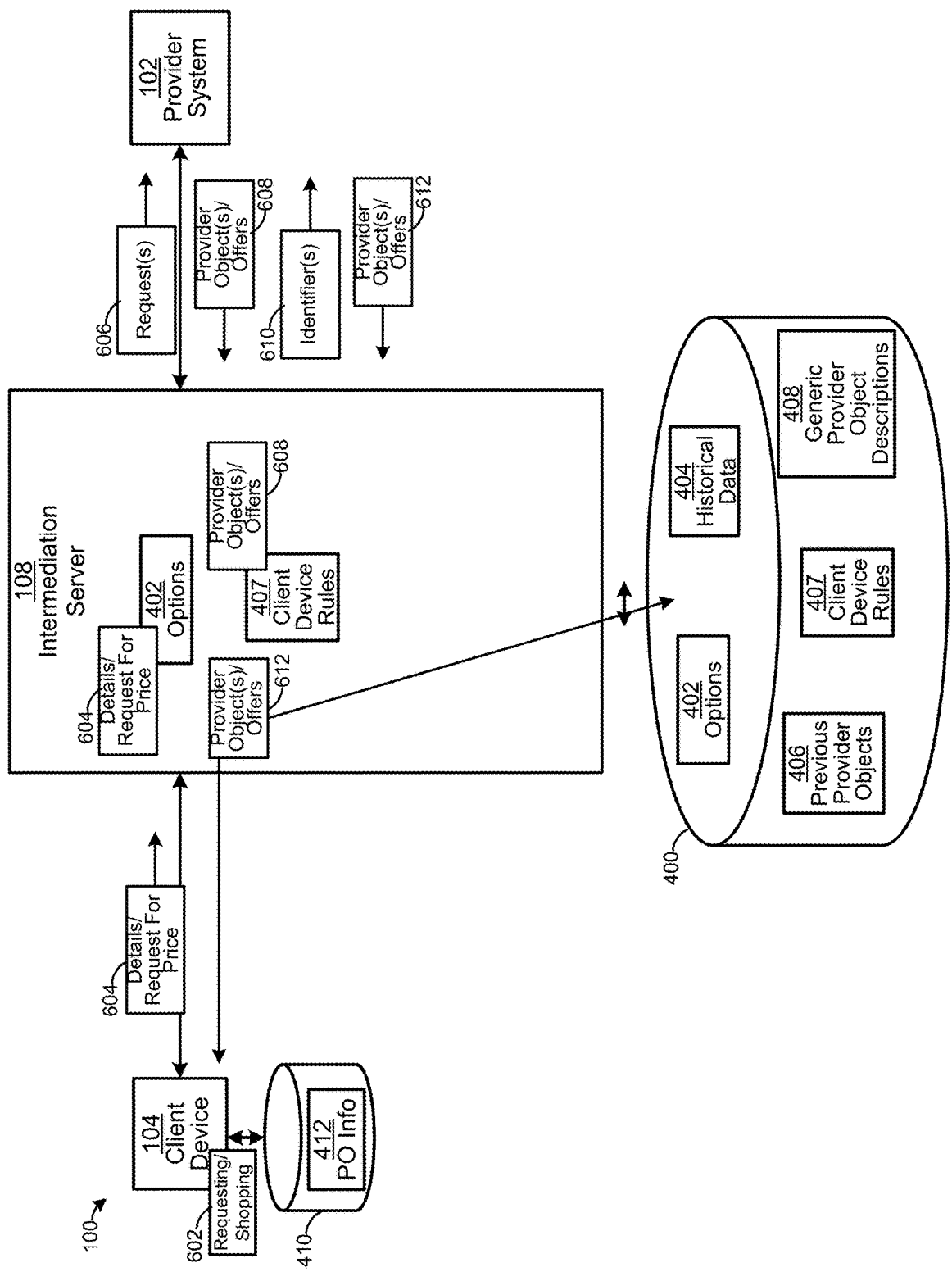
FIG. 6 depicts the system as depicted in FIG. 4 implementing a method for reproducing a requesting step between a client device and a provider system at an intermediation server, according to non-limiting examples.
Figure 7:
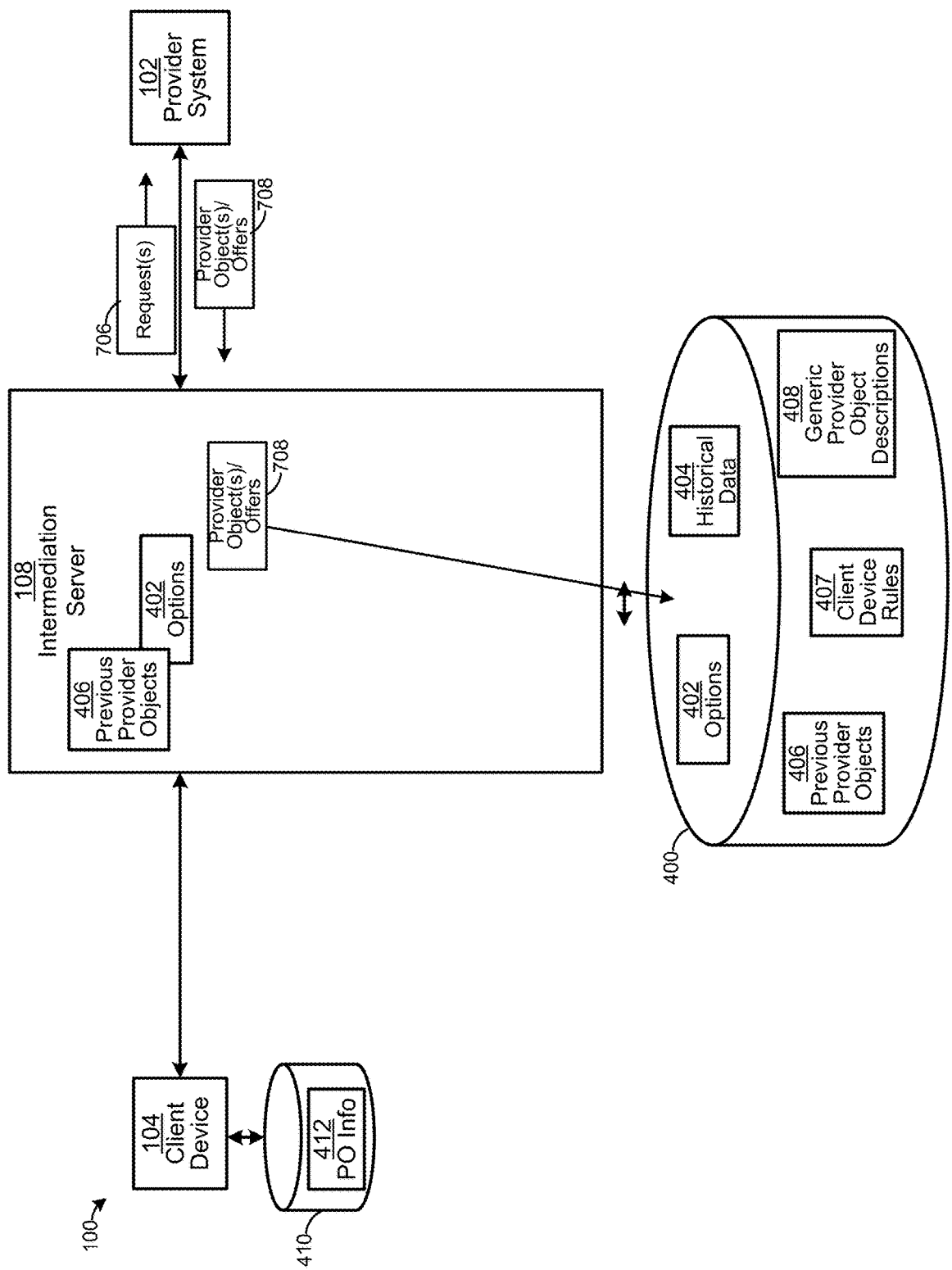
FIG. 7 depicts the system as depicted in FIG. 4 implementing a method for reproducing a requesting step between a client device and a provider system at an intermediation server, according to other non-limiting examples.
Figure 8:
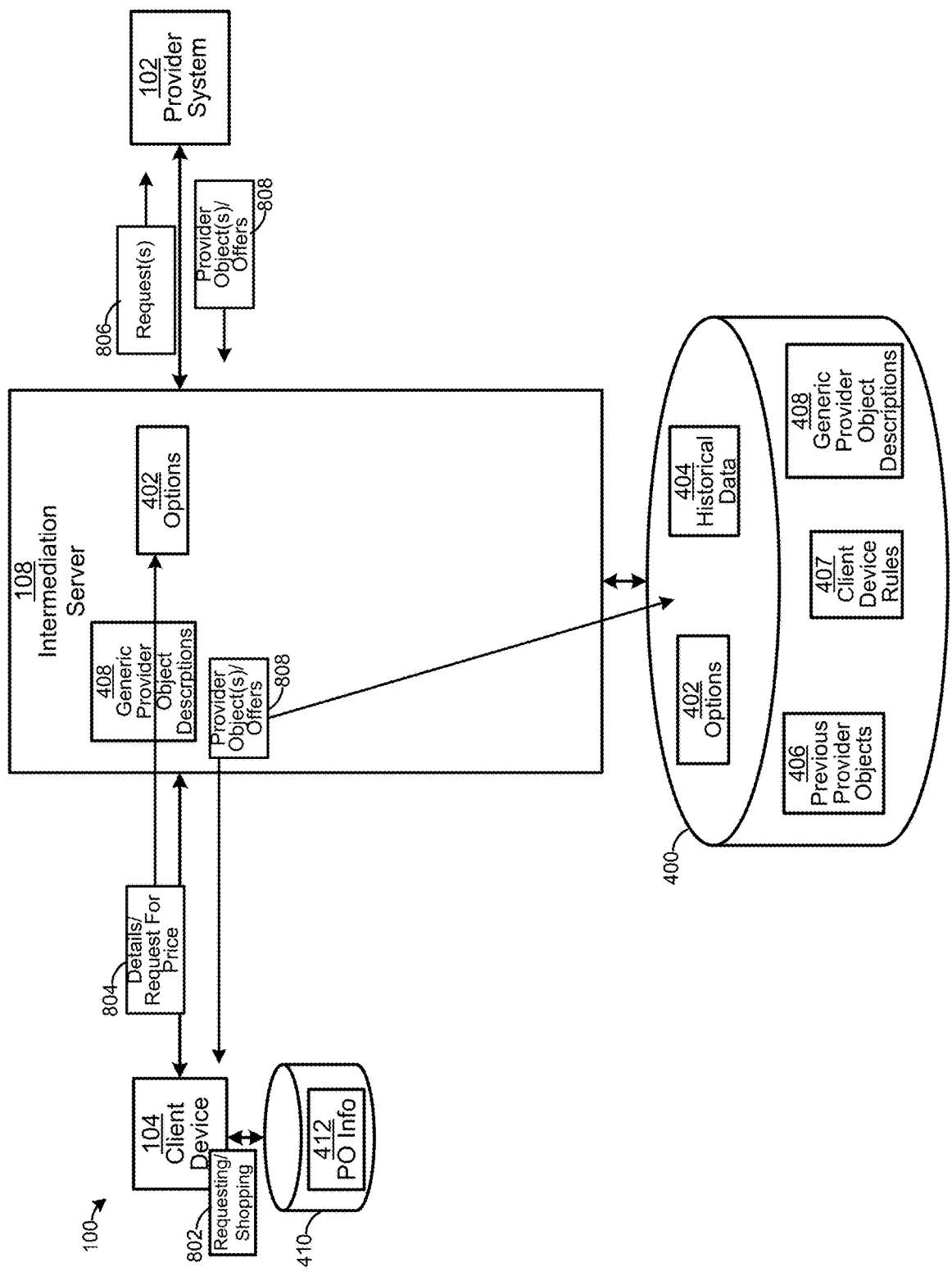
FIG. 8 depicts the system as depicted in FIG. 4 implementing a method for reproducing a requesting step between a client device and a provider system at an intermediation server, according to yet further non-limiting examples.

Attention is next directed to FIG. 6, FIG. 7 and FIG. 8 which depict aspects of different examples of the method 500 being implemented at the system 100. FIG. 6, FIG. 7 and FIG. 8 are substantially similar to FIG. 4, with like components having like numbers.

Attention is next directed to FIG. 6 in which the client device 104 implements a requesting and/or shopping step 602 based on the provider object information 412 stored at the memory 410. Put another way, the requesting and/or shopping step 602 implemented by the client device 104 is similar to the requesting step 302-1 of the computing-process flow 110, but occurs at the client device 104 interacting and/or searching the provider object information 412 rather than communicating with the provider system 102 via the intermediation server 108. Hence, in this example, the requesting step 302-1 of the computing-process flow 110 does not occur; rather the requesting step 602 occurs within the confines of a client device system (e.g. that includes the client device 104 and the memory 410), and without communicating with the provider system 102 via the intermediation server 108. For example details and/or criteria such as an originating city, a destination city and a date, and the like, may be used to search the provider object information 412 to generate a list of provider objects represented by the provider object information 412.

While a selection of one or more of the provider objects from the list of provider objects represented by the provider object information 412 may occur at the client device 104, such a selection does not include any offer identifiers associated with selected provider objects.

Nonetheless, the client device 104 attempts to implement a selecting step by providing, to the intermediation server 108, a communication 604 that includes details used to generate (e.g. at the block 502 of the method 500) one or more requests 606. The details may include, but are not limited to, details of a provider object selected at the requesting step 602. For example, the communication 604 may identify a flight between two cities on a particular date provided by the provider system 102, according to the provider object information 412 (which may or may not be accurate). In some examples, the communication 604 may comprise a request for a "firm" price for such a provider object.

However, the communication 604 is understood to be missing offer identifiers used in NDC-based data exchanges; in contrast, to the selecting step 302-2, the selecting step represented by the communication 604 is performed without offer identifiers, and the like, identifying particular provider objects.

As depicted, the communication 604 is received at the intermediation server 108, and the intermediation server 108 implements the block 502 of the method 500.

In particular, the intermediation server 108, reproduces the requesting step 302-2 for one or more provider objects which may meet the details of the communication 604. For example, as depicted, the intermediation server 108 requests identifiers (e.g. offer identifiers) and price estimates thereof by providing one or more requests 606 for the one or more provider objects to the provider system 102. The one or more requests 606 are understood to be one or more of generated and altered based on the options 402 associated with the provider system 102. For example, the options 402 generally narrow a number of the one or more provider objects requested via the one or more requests 606.

For examples, the details of the communication 604 may be used as input to a machine learning algorithm that used machine learning classifiers of the options 402 to generate the one or more requests 606. Furthermore, a machine learning algorithm, and the like, trained to reduce a response time of the provider system 102), may be used to further determine and/or optimize a number of the one or more requests 606, as described above.

Continuing with the above example, while details of the communication 604 may identify a flight between two cities on a particular date provided by the provider system 102, as there is no identifier of such a flight, the intermediation server 108 generates the one or more requests 606 for such a flight, on the basis of the options 402. For example, as previously described, the options 402 may indicate that the provider system 102 provides flights between given airports at the cities specified in the communication 604; hence, the one or more requests 606 may comprise criteria to search for flights between the two airports, for example rather than the two cities.

Similarly, the options 402 may indicate that the provider system 102 provides flights between the given airports at the cities specified in the communication 604, but only for one checked bag (e.g. without an additional checked bag fee). Hence, the one or more requests 606 may comprise criteria to search for flights, between the two airports, that include one checked bag, for example rather than flights that charge checked bag fees.

In this manner, the criteria of the one or more requests 606, which are used to perform a search at the provider system 102, may be refined and/or altered relative to the details of the communication 604.

Hence, the one or more requests 606 are understood to be generated to narrow a search for provider objects at the provider system 102, relative to if the details of the communication 604 were used to search for provider objects at the provider system 102.

As depicted, it is understood that the provider system 102 receives the one or more requests 606, performs a search for provider objects on the basis of the one or more requests 606, and returns, to the intermediation server 108, one or more provider objects 608, which are received (e.g. at the block 504 of the method 500) at the intermediation server 108. The one or more provider objects 608 are understood to include identifiers, such as offer identifiers, and the like.

As depicted, the intermediation server 108 may apply the client device rules 407 to select (e.g. thereby reproducing the selection step 302-2) a given provider object, and the intermediation server 108 may request, from the provider system 102, specific details of the given provider object, of the one or more provider objects 608, the specific details including a firm price of the given provider object, the specific details requested using a respective identifier (e.g. an offer identifier) of the given provider object. For example, as depicted, the intermediation server 108 provides a request 610 that includes an identifier of the given provider object. While this example is described with respect to one given provider object, the intermediation server 108 may request specific details of a plurality of given provider objects, such that the request 610 includes more than one identifier.

As depicted, the provider system 102 receives the identifier of the request 610 and returns a provider object 612 (and/or offer therefore) identified by the identifier of the request 610; the provider object 612 (and/or offer therefore) is understood to include a firm price and final details of the provider object 612, such as the date and time of a flight represented by the provider object 612. When the request 610 includes more than one identifier, the provider system 102 may return a number of provider objects with final prices and details that correspond to the number of identifiers.

As depicted, the provider system 102 may provide (e.g. at the block 506 of the method 500) the provider object 612 to the client device 104, for example as a response to the communication 604. The client device 104 may then implement the booking step 302-3 and the paying step 302-4, presuming a user of the client device 104 proceeds with booking and paying for a flight represented by the provider object 612

As depicted, the provider system 102 may alternatively store (e.g. at the block 508 of the method 500) the provider object 612 at the memory 400, for example as a previous provider object 406. Other information, such as the communication 604 and the one or more requests 606 and/or the request 610 may be stored at the historical data 404, as well as whether, or not, the flight associated with the provider object 612 was booked and/or paid for, for example to better train the various machine learning algorithms described herein, in one or more machine learning feedback loops.

In the example of FIG. 6, it is understood that the method 500 may further comprise the controller 202 and/or the intermediation server 108: receiving the communication 604 from the client device 104 that includes details used to generate the one or more requests 606 (e.g. of the block 502); implementing the reproducing (e.g. of the block 502) in response to receiving the communication 604; in response to receiving the one or more provider objects 608 from the provider system 102 (e.g. at the block 504), and based on the historical data 404 associated with the client device 104 (e.g. as represented by the client device rules 407), requesting, from the provider system 102, specific details of a given provider object of the one or more provider objects 608, the specific details including a firm price thereof, the specific details requested using a respective identifier of the given provider object; and implementing the providing (e.g. the block 506), to the client device 104, the one or more provider objects and the identifiers of the one or more provider objects by: providing, to the client device 104, the specific details of the given provider object (e.g. in the form of the provider object 612). In some examples, the communication 604 is received in the absence of a previous requesting step by the client device 104 (such a previous requesting step including communicating with the intermediation server 108), the communication 604 lacking any provider object identifiers (e.g. such as offer identifiers).

Put another way, the method 500 may further comprise the controller 202 and/or the intermediation server 108: in response to receiving the one or more provider objects 608 from the provider system 102, and based on the historical data 404 associated with the client device 104 (e.g. as represented by the client device rules 407), further narrowing the number of the one or more provider objects 608 that are one or more of provided to client device 104 and stored at the one or more memories 400.

Attention is next directed to FIG. 7, in which the client device 104 does not implement a requesting and/or shopping step either internally or conjunction with the intermediation server 108. Rather, the intermediation server 108 may process the previous provider objects 406, which may represent a cache of provider objects from which responses to requests for provider objects from the client device 104 may be populated, to determine which of the previous provider objects 406 may be "refreshed" and/or updated. For example, the intermediation server 108 may maintain the previous provider objects 406 as a cache of provider objects and there may be a criteria that no previous provider objects 406 should be older than a given time period (e.g. such as 1 day, 1 week, and/or any other suitable time period). As such, the intermediation server 108 may periodically process the previous provider objects 406 to determine which of the previous provider objects 406 are older than a given time period and initiate the method 500 to update the previous provider objects 406, as is next described. However, a determination of when to update the previous provider objects 406 and/or which previous provider objects 406 to update may occur in any suitable manner.

For example, the intermediation server 108 may determine that one or more of the previously received provider objects 406 are to be updated (e.g. based on age or any other suitable factors) and implement the reproducing (e.g. of the block 502) in response to the determining that the one or more previously received provider objects 406 are to be updated.

In particular, as depicted, the intermediation server 108 may provide one or more requests 706 to the provider system 102, the one or more requests 706 including details of provider objects of previously received provider objects 406 that have been determined to be updated. The one or more requests 706, however, omit offer identifiers, and the like, which are specific to the previously received provider objects 406, but which will not identify new provider objects 406 and/or offers therefor. A number of the one or more requests 706 may be optimized as described herein.

Similar to as described with respect to FIG. 6, the provider system 102 receives the one or more requests 706, performs a search for provider objects on the basis of the one or more requests 706, and returns, to the intermediation server 108, one or more provider objects 708, which are received (e.g. at the block 504 of the method 500) the intermediation server 108. The one or more provider objects 608 are understood to include identifiers, such as offer identifiers, and the like.

The intermediation server 108 may store (e.g. at the block 508 of the method 500), the one or more provider objects 608 at the memory 400, for example at the previously received provider objects 406; in particular a provider object 608 stored at the previously received provider objects 406 may replace a previous provider object that was determined to need updating.

Hence, the method 500 may further comprise, the controller 202 and/or the intermediation server 108: determining that one or more previously received provider objects 406, stored at the one or more memories 400, is to be updated; implementing the reproducing (e.g. of the block 502) in response to the determining that the one or more previously received provider objects 406 are to be updated; and implementing the storing (e.g. of the block 508), at the one or more memories 400, the one or more provider objects 708 by: replacing, at the one or more memories 400, the one or more previously received provider objects 406 (e.g. that have been determined to be updated) with the one or more provider objects 708.

In some of these examples, the method 500 may further comprise narrowing the one or more provider objects 708 that are to replace the one or more previously received provider objects 406 (e.g. that have been determined to be updated) by determining which of the one or more provider objects 708 received from the provider system 102 best correspond to a previously received provider object 406. For example, one of the previously received provider objects 406 may represent a flight from Toronto to Paris, at a given departure time (e.g. 08:00), and a plurality of the provider objects 708 received from the provider system 102 may correspond to this flight, but none being at the exact departure time as the previous flight. In these examples, a provider object 708 received from the provider system 102 that has a closest departure time to the given departure time (e.g. 08:00) may be used to replace the previously received provider object 406. For example, the plurality of the provider objects 708 received from the provider system 102 may represent flights from Toronto to Paris with respective departure times of 07:30, 07:59, and 09:00, and the provider object 708 representing the 07:59 flight may replace the 08:00 flight of the previously received provider object 406.

Attention is next directed to FIG. 8, which depicts another example of the method 500 that is similar to the example of FIG. 6, but which uses the generic provider object descriptions 408.

In particular, the client device 104 may implement a requesting (e.g. shopping) step 802 similar to the requesting step 602, and provide a communication 804, similar to the communication 604, to the intermediation server 108. The communication 804 is understood to include details used to generate requests to the provider system 102 and may include, but is not limited to, details of a provider object selected at the requesting step 802.

However, in contrast to the example of FIG. 6, at the example of FIG. 8, the intermediation server 108 may compare the details of the communication 804 with the generic provider object descriptions 408, for example to select, using the details of the communication 804, one or more of the generic provider object descriptions 408. For example, the details of the communication 804 may indicate that a price for flights from Toronto to Paris is being requested (e.g. on a particular date), and the generic provider object descriptions 408 may indicate most popular itineraries for such flights (e.g. flights with departure times between 07:30 and 08:30). Hence, the intermediation server 108 may generate one or more requests 806, that are similar to the one or more requests 606, but based on one or more generic provider object descriptions 408 selected using the details of the communication 804. In particular, the options 402 are also used to generate the one or more requests 806 as described above. For example, one or more generic provider object descriptions 408 may be selected based on details of the communication 804, and the options 402 may be used to generate the one or more requests 806. For example, as previously described, the options 402 may indicate that the provider system 102 provides flights between given airports at the cities specified in the communication 804; hence, the one or more requests 806 may comprise criteria to search for flights between the two airports, for example rather than the two cities, and only for flights which depart between times in the selected generic provider object descriptions 408.

As depicted, similar to as in the example of FIG. 6, the provider system 102 returns provider objects 808 in response to the requests 806 (e.g. similar to the provider objects 808), and the intermediation server 108 may provide the provider objects 808 to the client device 104 as a response to the communication 804 and/or store the provider objects 808 at the memory 400. While not depicted, the intermediation server 108 may apply the client device rules 407 to the provider objects 808 before providing the provider objects 808 to the client device 104, similar to as described with respect to FIG. 6.

Hence, the method 500 may further comprise, the controller 202 and/or the intermediation server 108: receiving the communication 804 from the client device 104 that includes details used to generate the one or more requests 606; selecting, from the one or more memories 400, using the details, one or more of the generic provider object descriptions 408; implementing the reproducing (e.g. at the block 502) in response to implementing the selecting (e.g. of the one or more of the generic provider object descriptions 408), the one or more generic provider object descriptions 408 also used to narrow the number of the one or more provider objects 808 requested via the one or more requests 806; and, implementing the providing (e.g. at the block 506), to the client device 104, the one or more provider objects 808 and the identifiers (e.g. offer identifiers) of the one or more provider objects 808. In some examples, the communication 804 is received in the absence of a previous requesting step by the client device 104 (such a previous requesting step including communicating with the intermediation server 108), the communication 804 lacking any provider object identifiers (e.g. such as offer identifiers).

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method for reducing bandwidth usage, the method comprising:

reproducing, via an intermediation server, a requesting step for one or more provider objects, the requesting step being a step of a computing-process flow between the intermediation server, a client device and one or more provider systems, the reproducing of the requesting step including requesting of identifiers and price estimates thereof for the one or more provider objects from a provider object information stored at a memory in communication with the client device, to determine a list of the one or more given provider objects that meet search criteria provided by the client device to the provider object information stored at the memory, the requesting of the identifiers and the price estimates for the one or more provider objects from the provider object information obviating requesting the identifiers and the price estimates from the one or more provider systems thereby reducing bandwidth usage between the intermediation server, the client device and the one or more provider systems, a provider object representing at least one item provided by a provider system, the reproducing of the requesting step further comprising providing one or more requests for the one or more provider objects in the list to the provider system in the absence of implementing the computing-process flow, the one or more requests being one or more of generated and altered based on options associated with the provider system as stored at one or more memories in communication with the intermediation server, the options to narrow a number of the one or more provider objects in the list requested via the one or more requests;

receiving, at the intermediation server, from the provider system, the one or more provider objects including the identifiers and the price estimates thereof; and, one or more of:

providing, from the intermediation server, to a client device, the one or more provider objects, and storing, via the intermediation server, at the one or more memories, the one or more provider objects;
in response to receiving the one or more provider objects from the provider system, and based on historical data associated with the client device, reproducing a selecting step of the computing process-flow by requesting, from the provider system, specific details of a given provider object of the one or more provider objects, the specific details including a price thereof, the specific details requested using a respective identifier of the given provider object, the reproducing of the selecting step occurring without communication with the client device to reduce bandwidth usage between the intermediation server and the client device;
implementing the providing, to the client device, the one or more provider objects and the identifiers of the one or more provider objects by: providing, to the client device, the specific details of the given provider object; and
thereafter implementing a remainder of the computing process-flow while omitting the requesting step and the selecting step,
wherein reproducing the requesting step occurs in an absence of a previous requesting step by the client device.

2. The method of claim 1, further comprising:
receiving a communication from the client device that includes details used to generate the one or more requests; and
implementing the reproducing the requesting step in response to receiving the communication.

3. The method of claim 2, wherein the communication is received in the absence of the previous requesting step by the client device, the communication lacking any provider object identifiers.

4. The method of claim 1, further comprising:
determining that one or more previously received provider objects, stored at the one or more memories, is to be updated;
implementing the reproducing the requesting step in response to the determining that the one or more previously received provider objects are to be updated; and
implementing the storing, at the one or more memories, of the one or more provider objects by: replacing, at the one or more memories, the one or more previously received provider objects with the one or more provider objects.

5. The method of claim 1, further comprising:
receiving a communication from the client device that includes details used to generate the one or more requests;
selecting, from the one or more memories, using the details, one or more generic provider object descriptions;
implementing the reproducing the requesting step in response to implementing the selecting of the one or more generic provider object descriptions, the one or more generic provider object descriptions also used to narrow the number of the one or more provider objects requested via the one or more requests; and,
implementing the providing, to the client device, of the one or more provider objects and the identifiers of the one or more provider objects.

6. The method of claim 5, wherein the communication is received in the absence of the previous requesting step by the client device, the communication lacking any provider object identifiers.

7. The method of claim 1, further comprising: in response to receiving the one or more provider objects from the provider system, and based on historical data associated with the client device, further narrowing the number of the one or more provider objects that are one or more of provided to the client device and stored at the one or more memories.

8. The method of claim 1, wherein the options are based on prepopulated information that is one or more of received from the provider system and associated with the provider system, the options comprising provider object types that are one or more of available and not available from the provider system.

9. The method of claim 1, further comprising determining a respective number of the one or more requests to provide based on historical data associated with the provider system.

10. The method of claim 9, wherein the historical data is indicative of speed of the provider system when previously responding to historical provider object requests.

11. An intermediation server for reducing bandwidth usage, the intermediation server comprising:
a communication interface; and
a controller configured to:
reproduce a requesting step for one or more provider objects, the requesting step being a step of a computing-process flow between the intermediation server, a client device and one or more provider systems, the reproducing of the requesting step including requesting of identifiers and price estimates thereof for the one or more provider objects from a provider object information stored at a memory in communication with the client device, to determine a list of the one or more given provider objects that meet search criteria provided by the client device to the provider object information stored at the memory, the requesting of the identifiers and the price estimates for the one or more provider objects from the provider object information obviating requesting the identifiers and the price estimates from the one or more provider systems thereby reducing bandwidth usage between the intermediation server, the client device and the one or more provider systems, a provider object representing at least one item provided by a provider system, the reproducing of the requesting step further comprising providing one or more requests for the one or more provider objects in the list to the provider system in the absence of implementing the computing-process flow, the one or more requests being one or more of generated and altered based on options associated with the provider system as stored at one or more memories in communication with the intermediation server, the options to narrow a number of the one or more provider objects in the list requested via the one or more requests;
receive, via the communication interface, from the provider system, the one or more provider objects including the identifiers and the price estimates thereof; and, one or more of:
provide, via the communication interface, to a client device, the one or more provider objects, and
store, at the one or more memories, the one or more provider objects;

in response to receiving the one or more provider objects from the provider system, and based on historical data associated with the client device, reproduce a selecting step of the computing process-flow by requesting, from the provider system, specific details of a given provider object of the one or more provider objects, the specific details including a price thereof, the specific details requested using a respective identifier of the given provider object, the reproducing of the selecting step occurring without communication with the client device to reduce bandwidth usage between the intermediation server and the client device;

implement the providing, to the client device, the one or more provider objects and the identifiers of the one or more provider objects by: providing, to the client device, the specific details of the given provider object; and thereafter implement a remainder of the computing process-flow while omitting the requesting step and the selecting step, wherein reproducing the requesting step occurs in an absence of a previous requesting step by the client device.

12. The intermediation server of claim 11, wherein the controller is further configured to:

receive a communication from the client device that includes details used to generate the one or more requests; and implement reproducing the requesting step in response to receiving the communication.

13. The intermediation server of claim 12, wherein the communication is received in the absence of the previous requesting step by the client device, the communication lacking any provider object identifiers.

14. The intermediation server of claim 11, wherein the controller is further configured to:

determine that one or more previously received provider objects, stored at the one or more memories, is to be updated;

implement reproducing the requesting step in response to the determining that the one or more previously received provider objects are to be updated; and implement storing, at the one or more memories, of the one or more provider objects by: replacing, at the one or more memories, the one or more previously received provider objects with the one or more provider objects.

15. The intermediation server of claim 11, wherein the controller is further configured to:

receive a communication from the client device that includes details used to generate the one or more requests;

select, from the one or more memories, using the details, one or more generic provider object descriptions;

implement reproducing the requesting step in response to implementing selecting the one or more generic provider object descriptions, the one or more generic provider object descriptions also used to narrow the number of the one or more provider objects requested via the one or more requests; and, implementing the providing, to the client device, of the one or more provider objects and the identifiers of the one or more provider objects.

16. The intermediation server of claim 11, wherein the controller is further configured to: in response to receiving the one or more provider objects from the provider system, and based on historical data associated with the client device, further narrowing the number of the one or more provider objects that are one or more of provided to the client device and stored at the one or more memories.

17. The intermediation server of claim 11, wherein the options are based on prepopulated information that is one or more of received from the provider system and associated with the provider system, the options comprising provider object types that are one or more of available and not available from the provider system.

18. The intermediation server of claim 11, wherein the controller is further configured to: determine a respective number of the one or more requests to provide based on historical data associated with the provider system.

* * * * *